United States Patent [19]

Kim

[11] Patent Number: 5,559,345

[45] Date of Patent: Sep. 24, 1996

[54] THIN FILM TRANSISTOR HAVING REDUNDANT METAL PATTERNS

[75] Inventor: Jeong J. Kim, Kyungki-Do, Rep. of Korea

[73] Assignee: Goldstar Co., Ltd., Rep. of Korea

[21] Appl. No.: 359,419

[22] Filed: Dec. 20, 1994

[51] Int. Cl.$^6$ .................................................. H01L 31/036
[52] U.S. Cl. ............................ 257/59; 257/920; 257/72; 257/773; 257/758; 359/87; 359/88
[58] Field of Search ................................... 257/920, 773, 257/758, 59, 72; 359/87, 88

[56] References Cited

U.S. PATENT DOCUMENTS 4,804,953  2/1989  Castleberry ............................ 257/59
5,334,860  8/1994  Naito ..................................... 257/59

*Primary Examiner*—Jerome Jackson, Jr.
*Assistant Examiner*—John Guay

[57] ABSTRACT

There is disclosed an LCD element which prevents delamination of a main data line and a redundancy line caused by the stress therebetween and breaking of the data line. It comprises a partially patterned redundancy line which reinforces a data line to prevent wire-breaking of the data line. According to the reinforcement, the stress is reduced, which leads to increasing adhesion between an ITO transparent electrode and the source-drain electrode. The advantages are accomplished by patterning the main data line and the redundancy line in part, forming the ITO and the source electrode in a variety of patterns or changing the lamination order therebetween.

8 Claims, 5 Drawing Sheets

THIN FILM TRANSISTOR HAVING REDUNDANT METAL PATTERNS

BACKGROUND OF THE INVENTION

1. Field of the Invention

The present invention relates, in general, to a liquid crystal display (LCD) and, more particularly, to pattern of data lines of an LCD.

2. Description of the Prior Art

In order to better understand of the background of the present invention, a description will be made for a conventional liquid crystal display (hereinafter LCD) element, in conjunction with FIGS. 1 and 2.

FIG. 1 shows a conventional LCD element, in plane and FIG. 2 presents the same LCD element, in cross section, taken along line A–A' of FIG. 1. As shown in these figures, a gate electrode of thin film transistor 1, a gate insulation layer 2, a semiconductor layer 3a, 3b a pixel electrode 4 and a redundancy line 6a, a source-drain electrode of a thin film transistor 5a, 5b and data line 66 are formed over a substrate (not shown), with respective patterns, in due order.

The conventional LCD element is generally fabricated as follows.

First, a metal is deposited as a substrate (not shown) and then patterned, to form a gate electrode 1. Over the resulting substrate including the gate electrode 1 is entirely deposited a gate insulation layer 2. A semiconductor layer 3a, 3b is formed over the gate insulation layer 2, in a predetermined pattern. An indium tin oxide (hereinafter referred to as "ITO") is deposited over the substrate and patterned, to form a pixel electrode 4. At this time, the ITO is also useful to form a redundancy line 6a. Thereafter, a deposition of metal and patterning process step is undertaken to form a source-drain electrode 5a, 5b over the semiconductor layer 3a, and the main data line on the redundancy line 6a. In such structured LCD element, a data line is comprised of the redundancy line 6a and the main data line 6b.

In such structured conventional LCD element the redundancy line 6a is formed of ITO, as mentioned previously, in order to prevent wire-breaking of the data line. However, stress may arise between the redundancy line 6a and the main data line 6b deteriorating the adhesion between them. As a result, the data line is disconnected.

SUMMARY OF THE INVENTION

Therefore, an object of the present invention is to overcome the above problems encountered in prior arts and to provide a LCD element, preventive of wire-breaking of the data line as well as improved in adhesion of redundancy line to the main data line.

In accordance with the present invention, the above object could be accomplished through a process step of patterning the redundancy line layer in part by, forming the ITO and the main data line in a variety of patterns, or changing the lamination order therebetween, thereby restraining the stress between the data line and the redundancy line.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENTS

Figure 1:
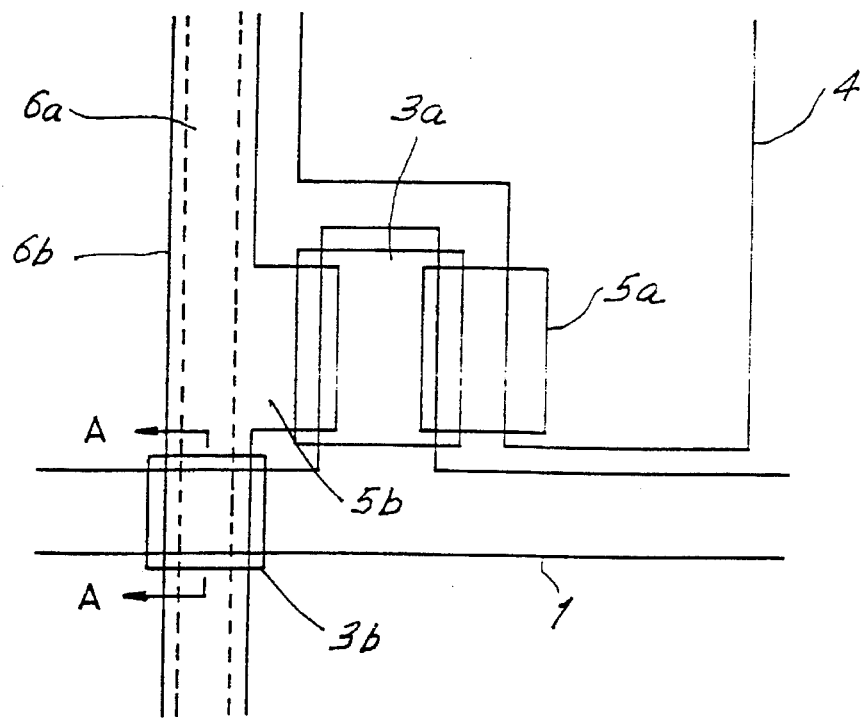
FIG. 1 is a schematic plane view showing a LCD element according to a prior art.
Figure 2:
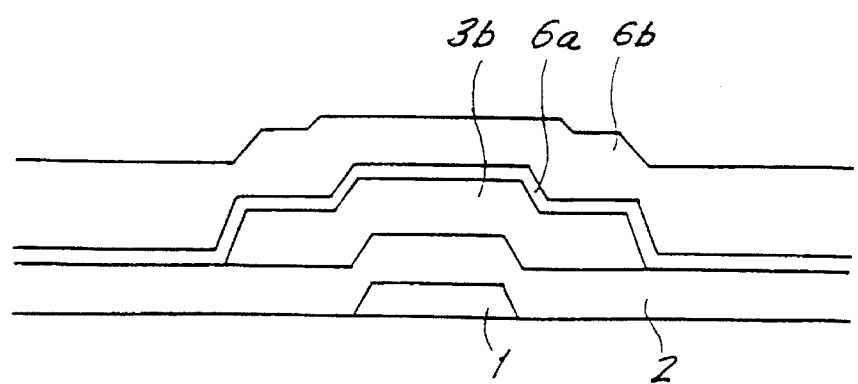
FIG. 2 is a schematic cross sectional view showing LCD element, taken along line A–A' of FIG. 1.

The application of the preferred embodiments of the present invention is best understood with reference to the accompanying drawings, wherein same reference numerals are used for same and corresponding parts, respectively.

Figure 3:
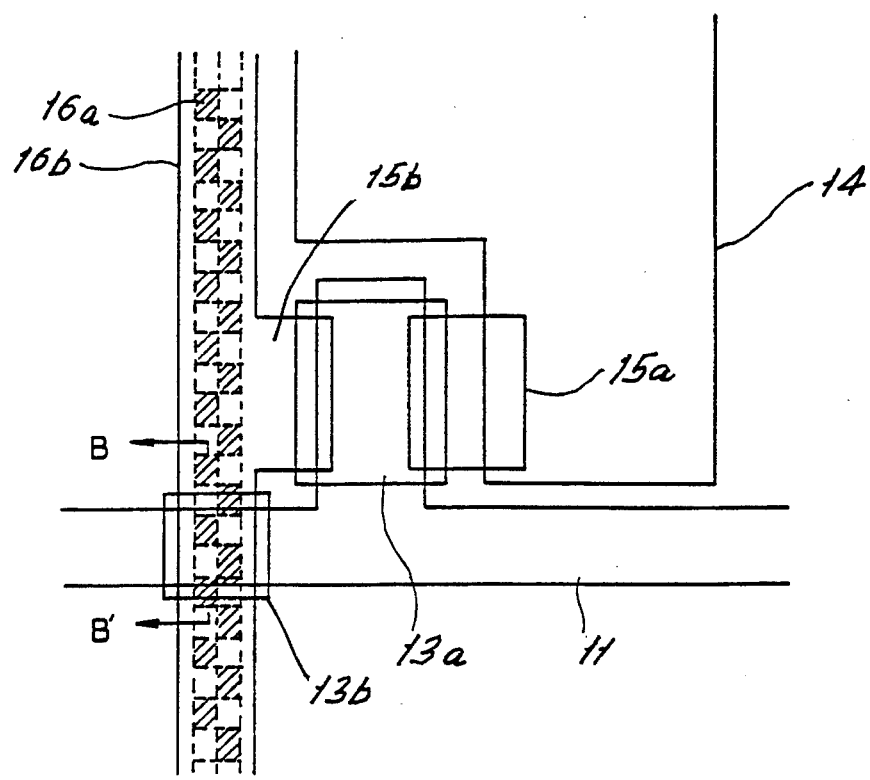
FIG. 3 is a schematic plane view showing a LCD element according to a first embodiment of the present invention.
Figure 4:
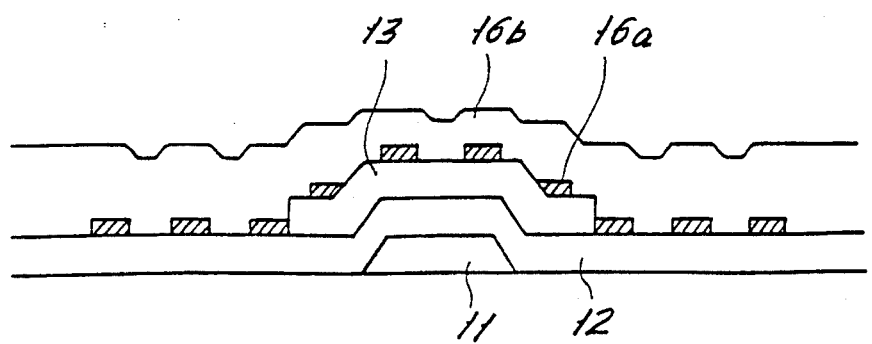
FIG. 4 is a schematic cross sectional view of the LCD element, taken along line B–B' of FIG. 3.

FIG. 3 shows a LCD element in plane, according a first embodiment of the present invention and FIG. 4 shows the same LCD element having a thin film transistor in cross section, taken along line B–B' of FIG. 3. As shown in these figures, a gate electrode 11, a gate insulation layer 12, a semiconductor layer 13b, a lower redundancy line 16a, and a main data line 16b are formed over a substrate (not shown), respective patterns, in due order. In this embodiment the redundancy line 16a is patterned in the form of a lattice.

Such structured LCD element according to this embodiment is fabricated as follows.

Initially, a metal is deposited on a substrate (not shown) and then patterned, to form a gate electrode 11 which is utilized as a gate line. Over the entirety of the resulting substrate including the gate electrode 11 is deposited an insulation layer, such as $SiO_x$ or $SiN_x$, to form a gate insulation layer 12. Subsequently, a semiconductor layer 13a, 13b, is formed on the gate insulation layer 12, in a predetermined pattern, followed by deposition of ITO on the substrate. A patterning process for ITO is undertaken, to form not only a pixel electrode 14 but also a lower redundancy line 16a which constitutes the data line, by use of mask. For the lower redundancy line 16a, ITO is selectively removed using the mask, so that it has a shape of lattice, as shown in FIG. 3. In FIG. 3, the hatched parts of the lower redundancy line 16a means ITO residue, whereas the other parts, that is, no hatch parts means the parts in which the ITO are not formed 12. Finally, deposition of metal and patterning is carried out, to form a source-drain electrode 15 semiconductor layer 13a and to form main data line 16b on redundancy line 16a.

Figure 5:
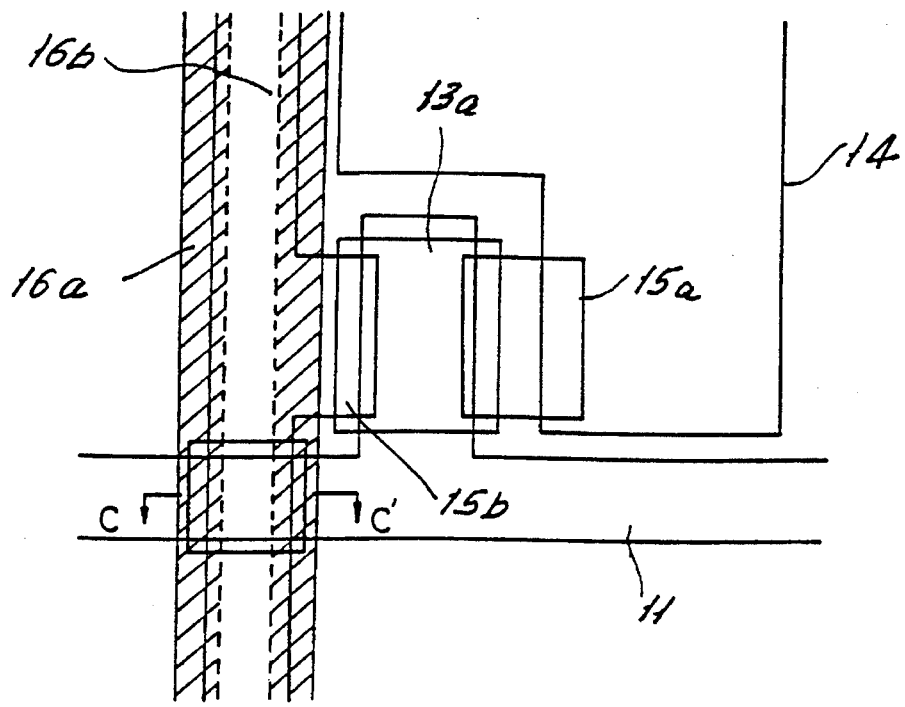
FIG. 5 is a schematic plane view showing a LCD element according to a second embodiment of the present invention.
Figure 6:
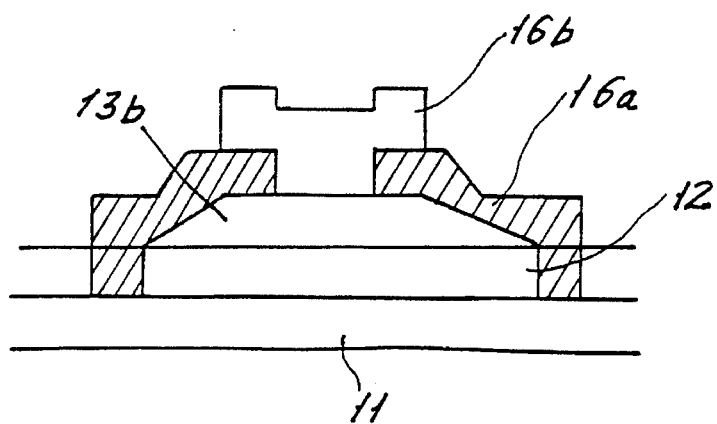
FIG. 6 is a schematic cross sectional view of the LCD element, taken along line C–C' of FIG. 5.

Referring now to FIGS. 5, there is shown a LCD element in plane, according to second embodiment of the present invention. FIG. 6 is a cross section of LCD element, taken along line C–C' of FIG. 5. As shown in these drawings, a gate electrode 11, a gate insulation layer 12, a semiconductor layer 13b and a redundancy line 16a, and a main data line 16b are laminated over a substrate (not shown), sequentially. In this embodiment, the redundancy line 16a is in two separated sublines formed parallel to a data line and the main data line is formed on both of two separated lines of the redundancy.

Such structured LCD element according to this embodiment is fabricated as follows.

Initially, a metal is deposited on a substrate (not shown) and then patterned, to form a gate electrode 11 which is utilized as a gate line. Over the resulting substrate including the gate electrode 11 is entirely deposited an insulator, such as $SiO_x$ or $SiN_x$, to form a gate insulation layer 12. Subsequently, a semiconductor layer 13a, utilized as 13b a semiconductor, is formed on the gate insulation layer 12, in a predetermined pattern, followed by deposition of ITO on the substrate. Using a mask, a patterning process for ITO is undertaken, to form not only a pixel electrode 14 but also a redundancy line 16a which constitutes the data line. For the redundancy metal 14b, the patterning is conducted in such a way that it may be parallel to the data line and separated in two subline, as shown in FIG. 5. Finally, a deposition of metal and patterning process step is carried out, to form a source-drain electrode 15a, 15b on the semiconductor layer 15a and to form main data line 16b on the redundancy line 16a. The lower redundancy metal 16a constituting the data line may be formed in a variety of shapes, for example, be formed along the data line.

Figure 7:
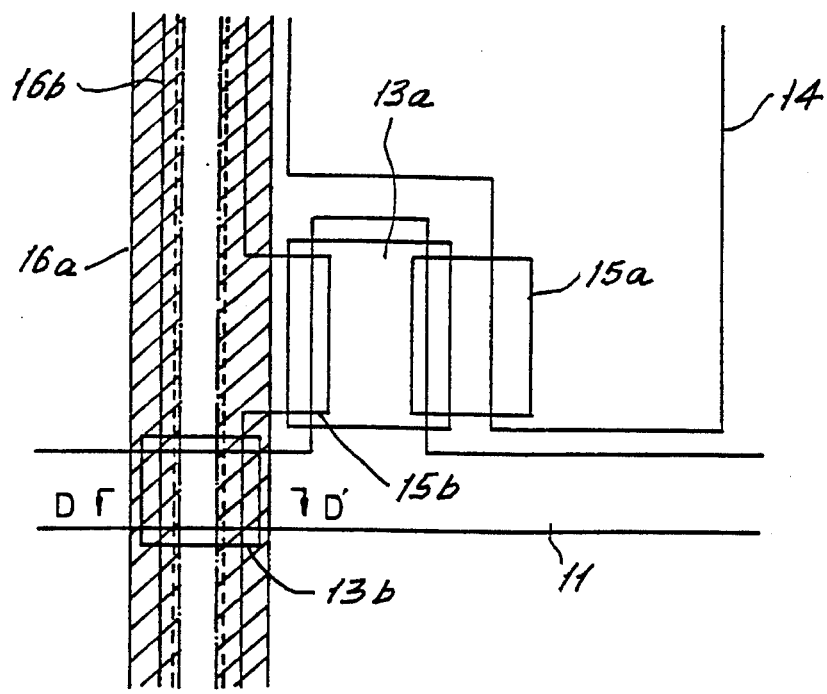
FIG. 7 is a schematic plane view showing a LCD element according to a third embodiment of the present invention.
Figure 8:
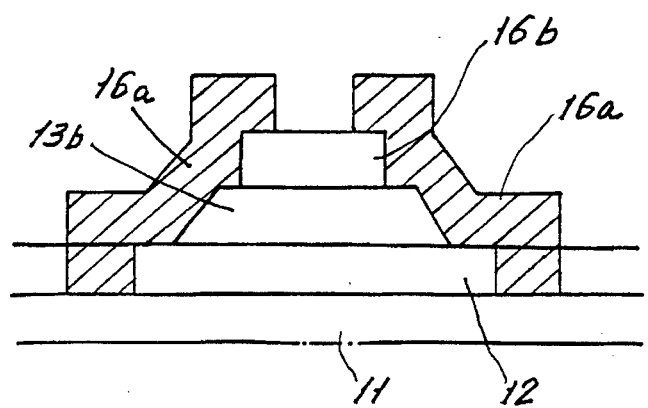
FIG. 8 is a schematic cross sectional view of LCD element, taken along line D–D' of FIG. 7.

With reference to FIG. 7, there is shown a LCD element in plane, according to a third embodiment of the present invention. FIG. 8 is a cross section of the LCD element, taken through line D–D' of FIG. 6. As shown in these drawings, a gate electrode 11, a gate insulation layer 12, a semiconductor layer 13b, main data line 16b, and an redundancy line 16a are laminated over a substrate (not shown), with respective patterns, in due order. In this embodiment, the is parallel to a data line and separated in two sublines. The sublines of the redundancy line are formed on the main data line.

Such structured LCD element according to a further embodiment of the present invention is fabricated as follows.

Initially, a metal is deposited on a substrate (not shown) and then patterned, to form a gate electrode 11 which is utilized as a gate line. Over the entirety of the resulting substrate including the gate electrode 11 is deposited an insulator, such as $SiO_x$ or $SiN_x$, gate insulation layer 12. Subsequently, semiconductor layer 13a, 13b, is formed over the gate insulation layer 12, in a predetermined pattern, followed by formation of a source-drain electrode 15a, 15b over the semiconductor layer 13a. Thereafter, ITO is deposited over the resulting structure and the patterned by use of mask, to form a redundancy line 16a. For the upper redundancy line 16a, patterning is carried out in such a way that it may be parallel to the data line and separated into two sublines.

Figure 9:
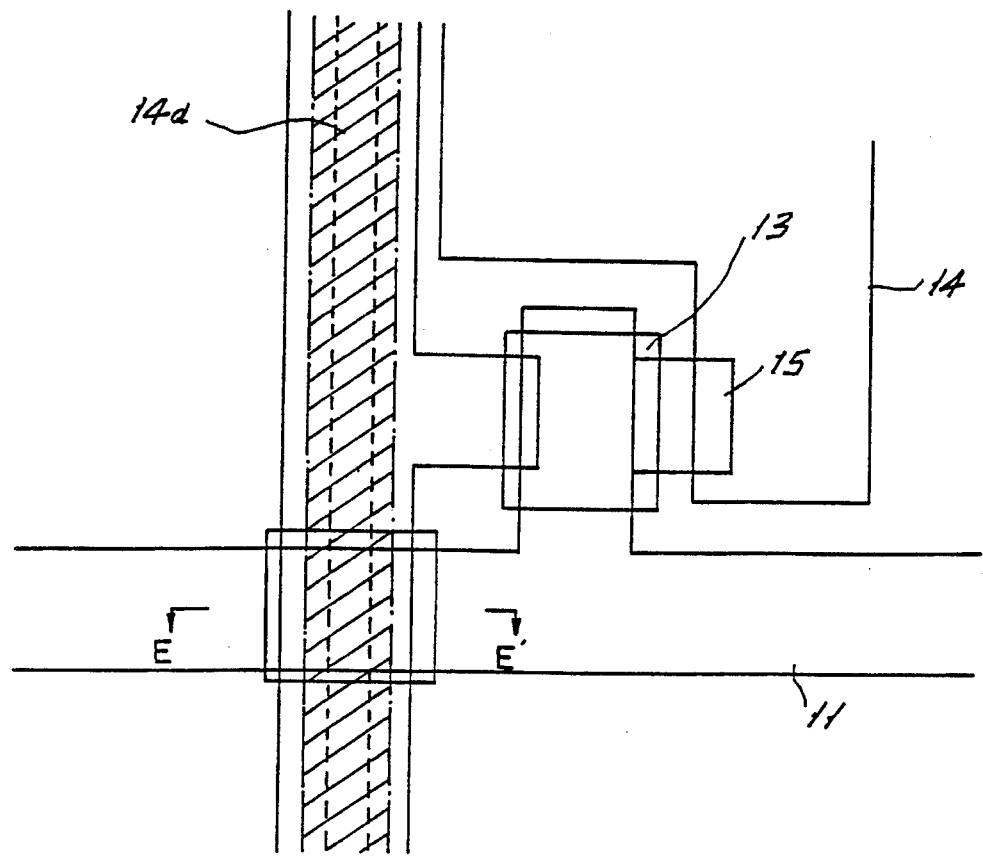
FIG. 9 is a schematic plane view showing a LCD element according to a fourth embodiment of the present invention.
Figure 10:
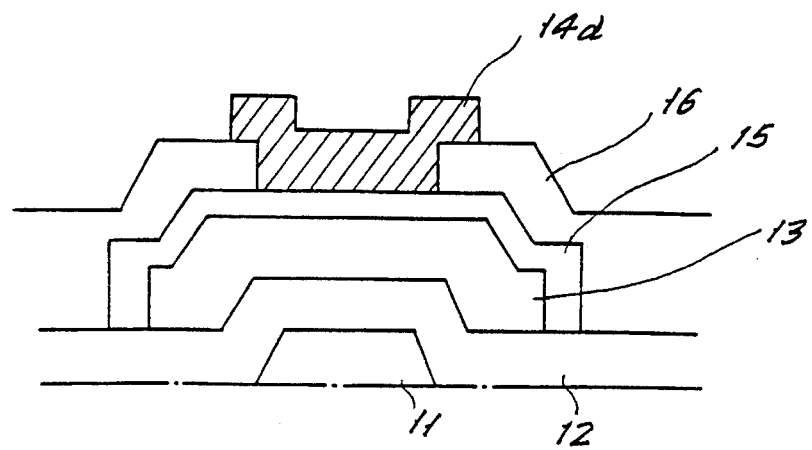
FIG. 10 is a schematic cross sectional view of the LCD element, taken along line E–E' of FIG. 9.

Turning now to FIG. 9, there is shown a LCD element in plane, according to a fourth embodiment of the present invention. FIG. 10 is a cross section of the LCD element, taken along line E–E' of FIG. 9. As shown in these drawings, a gate electrode 11, a gate insulation layer 12, a semiconductor layer 13a, 13b, a source-drain electrode 15a, 15b and a pixel electrode 14 and an redundancy line 16a are laminated over a substrate (not shown), with respective patterns, in due order.

Such a structured LCD element according to a further embodiment of the present invention is fabricated as follows.

Formation procedures of a gate electrode 11, a gate insulation layer 12 and an semiconductor layer 13 are the same as those of immediately preceding embodiment. A source-drain electrode and main data line is forme over the active layer 13a. Thereafter, a passivation layer 17 is laminated on the source-drain electrode 15a, 15b and main data line. Finally, ITO is deposited over the resulting structure and then patterned, to form an upper redundancy metal 16a. Meanwhile, the passivation layer 17 has a through-hole (not shown), so that the source-drain electrode 15 comes into contact with ITO therethrough.

As described hereinbefore, the LCD element according to the present invention has substantially reduced stress between the source-drain electrode and ITO by patterning the redundancy line in part, forming the ITO in a variety of patterns or changing the lamination order of main data line and the redundancy line.

Accordingly, the LCD element according to the present invention prevents delamination of the two layers caused by the stress and thus breaking of data lines. In addition, there is also the effect that adhesion of the ITO redundancy line to the main data line is strong according the reduction of the stress.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A liquid crystal display element having a thin film transistor, a data line and a gate line perpendicular to each other, the data line connected to one of a source and a drain electrode of the thin film transistor, and the gate line connected to a gate electrode of the thin film transistor, the display element comprising:

a substrate;

an insulation layer formed on the substrate;

a thin film transistor over the substrate, wherein a source electrode and a drain electrode of the thin film transistor are formed on the insulation layer;

a pixel electrode formed on the insulation layer, the pixel electrode being connected to the other of the source and drain electrode not connected to the data line; and a data line on the insulation layer, the data line including a first data line layer and a redundancy line layer, wherein the first data line layer includes material which is the same as a material of the one of the source and drain electrode connected to the data line, wherein the redundancy line layer is partially patterned so as to include at least two subredundancy lines.

2. The liquid crystal display element according to claim 1, further comprising a semiconductor layer between the insulation layer and the data line.

3. The liquid crystal display element according to claim 1, wherein the first data line layer is formed on the redundancy line layer.

4. The liquid crystal display element according to claim 3, wherein the redundancy line layer includes two subredundancy lines and the two subredundancy lines are electrically connected with the first data line.

5. The liquid crystal display element according to claim 3, wherein the subredundancy lines include a plurality of substantially rectangular parts.

6. The liquid crystal display element according to claim 1, wherein the redundancy line layer is formed on the first data line layer.

7. The liquid crystal display element according to claim 6, wherein the redundancy line layer includes two subredundancy lines that are formed on each side of the first data line, respectively.

8. The liquid crystal display element according to claim 1, wherein the subredundancy lines include indium tin oxide ITO.

* * * * *